United States Patent
Tarn

(10) Patent No.: US 9,831,913 B2
(45) Date of Patent: Nov. 28, 2017

(54) POWER SOURCE EQUIPMENT AND POWER SUPPLYING METHOD FOR POWER OVER ETHERNET SYSTEM

(71) Applicant: IC Plus Corp., Hsinchu (TW)

(72) Inventor: Hann Yun Tarn, Hsinchu (TW)

(73) Assignee: IC Plus Corp., Hsinchu (TW)

( * ) Notice: Subject to any disclaimer, the term of this patent is extended or adjusted under 35 U.S.C. 154(b) by 50 days.

(21) Appl. No.: 15/077,245

(22) Filed: Mar. 22, 2016

(65) Prior Publication Data

US 2017/0230080 A1   Aug. 10, 2017

(30) Foreign Application Priority Data

Feb. 4, 2016   (TW) .............................. 105103702 A

(51) Int. Cl.
  *G06F 1/30* (2006.01)
  *H04B 3/54* (2006.01)
  *H04L 12/10* (2006.01)

(52) U.S. Cl.
  CPC ............... *H04B 3/54* (2013.01); *H04L 12/10* (2013.01)

(58) Field of Classification Search
  None
  See application file for complete search history.

(56) References Cited

U.S. PATENT DOCUMENTS

| | | | |
|---|---|---|---|
| 7,257,724 B2 | 8/2007 | Lehr et al. | |
| 8,412,961 B2 | 4/2013 | Gammel et al. | |
| 2007/0296394 A1* | 12/2007 | Landry | H04L 12/10 323/371 |
| 2015/0057974 A1* | 2/2015 | Lee | G06F 11/3495 702/186 |
| 2015/0333526 A1* | 11/2015 | Deng | H04L 12/10 307/35 |

* cited by examiner

*Primary Examiner* — Paul J Yen
(74) *Attorney, Agent, or Firm* — Muncy, Geissler, Olds & Lowe, P.C.

(57) ABSTRACT

A power source equipment for Power over Ethernet system continues to inspect power consumption of all connecting ports, in order to adjust power allocation to the communication ports. When the power consumption of a particular connecting port shows a trend of increase, its power allocation is increased; otherwise, decreased. After a total power allocation is decreased, additionally available power may be generated and provided to an additional communication port. A method for adjusting the power allocation is also disclosed.

10 Claims, 3 Drawing Sheets

POWER SOURCE EQUIPMENT AND POWER SUPPLYING METHOD FOR POWER OVER ETHERNET SYSTEM

FDFCROSS REFERENCE TO RELATED APPLICATIONS

This non-provisional application claims priority under 35 U.S.C. §119(a) on Patent Application No(s). 105103702 filed in Taiwan, Republic of China on 2016 Feb. 4, the entire contents of which are hereby incorporated by reference.

BACKGROUND OF THE INVENTION

Field of Invention

The present invention relates generally to a power over Ethernet system, and more particularly to an inspection device and method for dynamically adjusting supplied powers to powered devices in a power over Ethernet system.

Related Art

Power over Ethernet (PoE) has found widespread application in many areas. For example, IEEE has released two standards that relate to PoE-IEEE 802.3af in 2003 and IEEE 802.3at in 2009. These standards are adopted by many applications. In this disclosure, these relevant standards relevant to the PoE will be referred to as the "PoE standard" hereinafter. PoE technology allows supplying electric power through Ethernet to devices such as Internet phone, wireless stations, network cameras, hubs, and even computers without the need of extra power outlet. Combining data transmission and power supply, PoE technology can reduce the cost and complexity of the overall network computing system.

In a power over Ethernet (PoE) system, the electric power is provided by the power source equipment (PSE) via Ethernet data cable to the powered device (PD). The power source equipment may include an Ethernet switch, a router, or other network switching and midspan devices. In the PoE system, a powered device is connected to the network and configured to obtain or request power from the power source equipment over the network.

In a PoE system, the power source equipment may connect to multiple powered devices through their network connecting ports, but may also connect to devices that will not or cannot obtain power from the power source equipment. In a real application, the powered device may include devices that are in compliance with the PoE Standard, and devices that are compatible with the PoE Standard. The PoE Standard provides that, before a power source equipment may provide power to a powered device, the power source equipment must determine whether the particular powered device is in compliance with the PoE standard. In addition, most of the power source equipment, or the power supply equipment that incorporates power source equipment, will also determine whether a device is compatible with the PoE standard. This may include a legacy device that is compatible with the PoE Standard. If compatible, the power source equipment will also provide power to such compatible device.

Under the PoE standard, when carrying out said inspection, the power source equipment provides a signal to the connecting port of a target device, and detects the response signal from the connecting port. If the response signal indicates a signature resistance ranging from 19 k to 26.5 k ohms, then the device is determined to be a powered device in compliance with the PoE standard, i.e., a qualified powered device. The PoE Standard also specifies that the voltage provided by the power source equipment should be between about 2.8 V and 10 V, the current should be less than about 5 mA, and the voltage difference of the testing signal should be more than 1 V.

During the inspection, a typical method is for the power source equipment to apply a voltage or current to the particular connecting port, and then to measure the response signal from the target device after a predetermined period. The signature resistance is calculated based on the current/voltage relationship from the two signals. If a current is applied, the current is normally in the range of 150 μA to 400 μA, and the voltage of the connecting port is measured to calculate the value of the signature resistance. In this case, a target device in compliance with the PoE standard will cause the power sourcing device to detect an about 2.8 V to 10 V voltage drop in the connecting port.

Alternatively, if the testing signal is a voltage signal, the voltage is generally between about 2.8V to 10V, and the detected current value shall be between about 87.5 uA to 625 uA.

Based on the result, the power source equipment will decide whether to perform classification on the powered device. From the classification, the power source equipment may provide different power levels to different powered devices.

To classify the powered device, the IEEE 802.3 of/at standard provides five classes (classes 0, 1, 2, 3, and 4) with respective power allocation upper limits (15.5 W, 4 W, 7 W, 15.5 W and 30 W). In reality, many powered devices with low power consumption will also label themselves as high power-allocated device. For example, a powered device with a normal power range of 7 W may label itself as class 4. This is to prevent the operation of the powered device being discontinued due to power supply limit from the power source equipment of the PoE system. This, however, will also cause the power source equipment to reserve 30 W for the powered device. Since the powered device only uses 7 W, the remaining reserved power will not be able to be allocated to other powered devices connected to the connecting port, thereby causing power allocation waste.

Specifically, when a power source equipment is to supply power to a newly-added powered device, it will sum the allocated power values of all connected powered devices that it currently supplies power to. It will then compare the summed value with the total power supply value that the PoE system is capable of supplying. The difference of the two is then to be compared with the newly-added powered device based on its classification. If the power allocation requested is greater than the difference, then no power will be supplied to the newly-added powered device, or the power supplied to a connected powered device with lower priority will be stopped. Once stopped, the sum of the difference and the power allocation values of the stopped device, or part of the sum thereof, will be allocated to the newly-added powered device. In some cases, the newly-added powered device may only need 7 W but still labels itself with high power level. This will cause the PoE system not being able to supply power to the newly-added powered device, or may cause the PoE system stop supplying power to another with lower priority.

Under this situation, a known technique is to calculate two parameters in addition to the total power supply the PoE system is capable of supplying, and the maximum power from the powered devices that the PoE system is currently supplying power to or waiting for the power supply. The two parameters include the maximum total power consumption and the critical power value. In a PoE system, the total power supply>maximum total power consumption>critical total power value. In addition, this method will also specify priority for each connected powered device. The PoE system will continue monitoring the total power consumption from the powered devices it supplies. When the total power consumption surpasses the maximum total power consumption, it will stop supplying power to powered devices with lower priority. When the total power consumption is lower than the critical total power value, the PoE system will supply power to additional, connected powered devices based on their priority levels. When the total power consumption is between the maximum total power consumption and the critical total power value, the PoE system will stop supplying power to a powered device with lower priority to provide power allocated to the low priority device to powered devices with higher priority. Details of the above-mentioned technique can be referred to in U.S. Pat. No. 7,257,724, entitled "Method and Apparatus for Power Management in a Local Area Network." One drawback of such technique is that the powered devices with low priority may often suffer power outage, and sometimes may not even obtain any power from the PoE system.

Another known technique is for the PoE system to measure the real power consumption of the powered devices. For example, in case where a powered device with only 7 W power consumption is labeled with class 4 specification, the system will lower the classification of the powered device to a lower one. For example, it may classify the powered device with just the classification that has an upper power limit that is just above the real power consumption. This method will indeed increase the power allocation efficiency at that time, but can still cause powered devices to suffer power outage even when there is available power to supply.

For example, a common powered device is an IP cam. The power consumption of the powered device may be as illustrated in FIG. 3. As shown, when the system starts supplying power to the powered device, the powered device and the computer (server) will be engaging in connection setting at time T1, and will not need a full power to operate. At this moment, if the PoE system measures the actual power consumption of the powered device, it will mistakenly reduce its power classification. Now, when the IP cam wants to begin initiating a full data transmission or night lighting at time T2, the power consumption needs to be dramatically increased, as illustrated in the dash line in FIG. 3. Because the powered device now has a lowered classification, at time T2, the powered device may shut down due to power overload. Furthermore, when the PoE system re-supplies power to the IP cam the next time, the whole situation will repeat to cause the powered device to shut down again and again.

Yet there is no power source equipment of the PoE system that can overcome the inefficient power allocation due to the difference between the classification power allocation and the real power consumption. In addition, currently there is no power source equipment of the PoE system that is able to render the power difference between its classification setting and its real power consumption to other powered devices, especially the powered devices with lower priorities.

SUMMARY OF THE INVENTION

It is an objective of the present invention to provide a novel power source equipment of the PoE system to dynamically monitor multiple powered devices in order to supply proper power levels to powered devices that needs power.

It is an objective of the present invention to provide a novel power source equipment of the PoE system that supplies power to newly added powered devices from the difference between a total power allocation and a summed power consumption of all power-supplying powered devices.

It is an objective of the present invention to have a power source equipment to prevent repeated shutting down of power-supplying powered devices.

It is also an objective of the present invention to provide a power supplying method for power source equipment of the PoE system that provides these advantages.

According to the present invention, a power source equipment for a power over Ethernet (PoE) system is provided and comprises at least two connecting ports, each to be connected by a powered device via a network wire. The power source equipment further comprises an inspection device in connection with the respective connecting ports and configured to send inspection signals to the connecting ports, to obtain a response signal from the corresponding connecting ports, after a predetermined period, and to determine based on the responding signal whether a particular connecting port has been connected by a target device and whether the connected device is a powered device suited for supplying power. The power source equipment is further configured to send a classification inspection signal to a connecting port determined to be in connection with a powered device, to obtain a classification response signal from the connecting port, after a predetermined period, and to determine a class associated with the powered device based on the classification response signal, for supplying power with an upper limit value Iallow between an upper limit power allocation Iclass associated with the classification and a predetermined lower bound Ilower. The power source equipment is further configured to supply power to a connecting port, when the upper limit value Iallow is lower than the difference of a total power supply of the power source equipment and a summed total power allocation of the power-supplying powered devices.

The power source equipment further comprises a monitoring device, configured to continuously monitor the particular connecting ports to obtain a power consumption value along a time axis of a powered device connected to the respective ports and to determine a power consumption trend parameter of the connecting ports. The monitoring device is further configured to:

shut the power source equipment from supplying power to a connecting port when the trend parameter indicates the connecting port often over-consumes the upper limit power allocation Iclass;

increase the upper limit power value Iallow of the connecting port to a value no greater than the upper limit power allocation Iclass, when the trend parameter indicates a rising power consumption trend for the connecting port; and decrease the upper limit power value Iallow of the connecting port to a value no less than the predetermined lower bound Ilower, when the trend parameter indicates a declining power consumption trend for the connecting port.

In the preferred embodiments of the present invention, the monitoring device determines a rising power consumption trend when there are a predetermined number of inspection point values greater than their preceding inspection point values, and determines a declining power consumption trend when there are a predetermined number of inspection point values less than their preceding inspection points. The predetermined number may be 3 or more.

In some preferred embodiments of the present invention, the power source equipment divides each classification into a plurality of pitches and adjusts the upper limit power value Iallow based on the pitches. The classes may be divided by equal pitches or variable pitches.

The power source equipment may be further configured to degrade the classification of the connecting port, when the trend parameter indicates the connecting port often consumes less power than the upper limit power allocation Iclass of a lower class.

The present invention also provides a method of supplying power from a power source equipment of a power over Ethernet (PoE) system. The method may be used in a power source equipment of a PoE system, wherein the power source equipment comprises at least two connecting ports, each to be connected by a powered device via a network wire. The power source equipment further comprises an inspection device in connection with the respective connecting ports and configured to inspect whether a powered device suited for supplying power is connected with a particular connecting port and to determine a power level to be supplied to the connecting port, and a monitoring device to monitor power consumption of the connecting ports and to adjust power supplied to the connecting ports. The invented method is actuated, after the following inspection and classification operations:

The inspection device applies an inspection signal to a connecting port, obtains a response signal from the connecting port after a predetermined time and determines whether a target device is connected to the connecting port and whether the target device is a powered device suited for supplying power.

After a connecting port is determined to be in connection with a suited powered device, the inspection device applies a classification inspection signal to the connecting port, obtains a classification response signal from the connecting port after a predetermined time and determines a classification of supplied power for the connecting port, in order to supply to the connecting port power with an upper limit power value Iallow between an upper limit power allocation Iclass associated with the classification of the connecting port and a predetermined lower bound Ilower.

For a connecting port determined to be in connection with a suited powered device, The power source equipment supplies power to the connecting port, when the upper limit power Iallow of the connecting port is smaller than the difference of a total power supply of the power source equipment and a summed power allocation to all the power-supplying connecting ports;

If the upper limit power Iallow of the connecting port is greater than such difference, the monitoring device continuously monitors all power-supplying connecting ports to obtain power consumption values along a time axis of the respective connecting ports, and to determine a power consumption trend parameter for the connecting ports;

The monitoring device:

increases the upper limit power value Iallow of a connecting port to a value no greater than the upper limit power allocation Iclass, when the trend parameter indicates a rising power consumption trend for the connecting port;

decreases the upper limit power value Iallow of a connecting port to a value no less than the predetermined lower bound Ilower, when the trend parameter indicates a declining power consumption trend for the connecting port; and shuts the power source equipment from supplying power to a connecting port, when the trend parameter indicates the connecting port often over-consumes the upper limit power allocation Iclass.

In some preferred embodiments of the present invention, the power source equipment divides each classification into a plurality of pitches and adjusts the upper limit power value Iallow based on the pitches. The classes may be divided by equal pitches or variable pitches.

The power source equipment may be further configured to degrade the classification of the connecting port, when the trend parameter indicates the connecting port often consumes less power than the upper limit power allocation Iclass of a lower class.

According to the present invention, the monitoring device may dynamically monitor actual power consumption of each powered devices connected to the connecting ports to provide trend values. If the actual power consumption is below the allocated power, it can release the overly allocated power to additional powered devices or powered devices with lower priority.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below and the claims. The drawings are not necessarily to scale. Emphasis is instead generally placed upon illustrating the general principles of the present invention. In these drawings, like numerals are used to indicate like parts throughout the various views.

DETAILED DESCRIPTION OF THE INVENTION

The present invention will be apparent from the following detailed description, which proceeds with reference to the accompanying drawings, wherein the same references relate to the same elements. The present invention provides a novel power source equipment of the PoE system and method used therein to supply power to connecting ports. The present invention discloses a monitoring device that dynamically monitors power consumption of the connecting ports, in order to allocate extra power to a new powered device.

Figure 1:
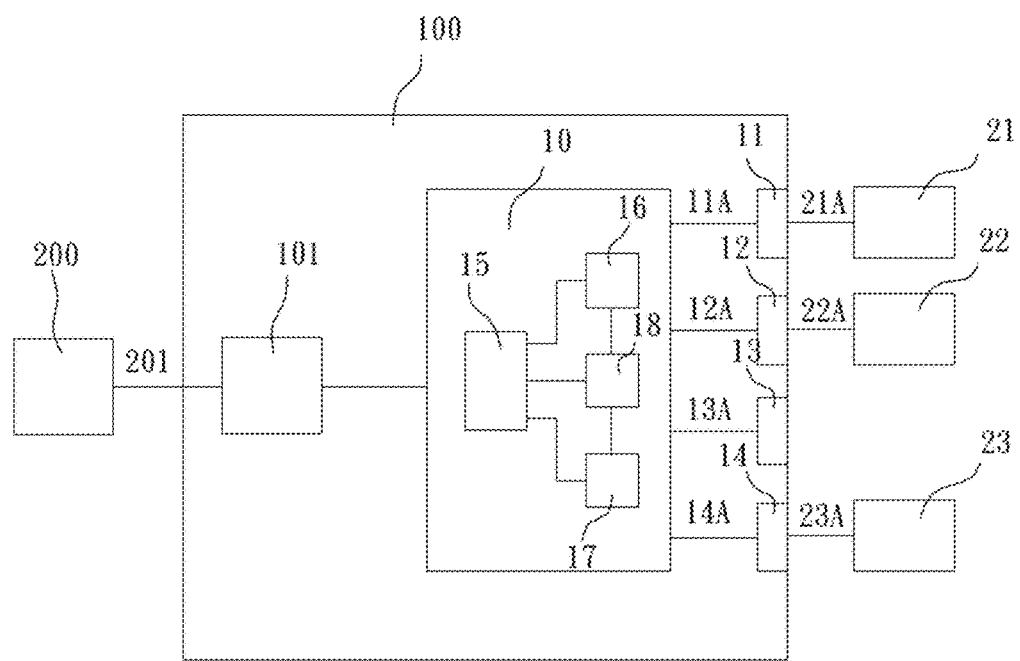
FIG. 1 illustrates an embodiment of the inspection device for the PoE system.

FIG. 1 illustrates an embodiment of the power source equipment for the PoE system. As illustrated, the power source equipment 100 is incorporated in a power source equipment 100 of the PoE system and supplies power to a plurality of powered devices. Together with the power source equipment 100 and a power source 200, they constitute the PoE system. The power source equipment 100 provides power, from the power source 200 and through the power cable 201 to the powered devices. As shown in FIG. 1, the power source 200 provides power through the power cable 201 into the I/O Interface 101 of the power source equipment 100, and finally into an inspection device 10. The power source equipment 100 also provides multiple connecting ports 11, 12, 13 and 14. They allow connection to the external devices 21, 22, 23 through the network wire 21A, 22A, and 23A. Although FIG. 1 illustrates only four connecting ports, a person of ordinary skill in the art will recognize that the number of ports can be greater or less than the number illustrated. For example, a typical power source equipment 100 can offer 8 connecting ports. The present invention is applicable to these cases as well. As illustrated, there are three external devices 21, 22, and 23 connecting to the connecting ports 11, 12 and 14. There is no external device connecting to the connecting port 13. The external devices 21, 22 and 23 may be powered devices in compliance with the PoE standard, may be compatible powered devices, may be incompatible powered devices, or may be just a typical capacitor load or resistor load.

The power source equipment 100, via 4 sets of signal wires 11A, 12A, 13A, and 14A, connects to the connecting ports 11, 12, 13, and 14. The function of the power source equipment 100 is to transfer the power from the power source 200 to the external devices 21, 22 and 23 that are capable of receiving power.

In general, the signal wires 11A, 12A, 13A and 14A may each comprises 2 pairs of signal lines for transmitting electric signal and power. At the same time, the network wires 21A, 22A, and 23A may each comprises 2 pairs of signal lines in the shape of a twisted pair. A person of ordinary skill in the art would recognize that the number of lines inside the signal wire or the network wire may vary, as long as each of them has a pair of signal wires.

The PoE system configured as above is well known in the art, and various techniques have been described in the literature, including the IEEE 802.3af and IEEE 802.3at standards.

According to the PoE standard, a standard-compliant power source equipment must first conduct inspection and classification toward the external devices 21, 22 and 23 before providing power to a suitable external device. For those devices that are in compliance with, or compatible with, the PoE standard, there currently exist methods and devices to inspect and classify these devices, such as the disclosure in the U.S. Pat. Nos. 7,856,561 and 8,412,961.

In an ideal situation, all external devices connected the connecting ports 11, 12 and 14 are powered devices in compliance with or compatible with the PoE standard. During the inspection stage, these external devices can be called "target devices." When it is determined that a target device is in compliance with the PoE standard, the device is then called a powered device. In the following description, we will use "target device" to mean an external device that connects to the connecting ports 11, 12 and 14, and "powered device" to mean an external device that complies with or is compatible to the IEEE PoE standard, i.e., an external device determined to be a qualified powered device.

In FIG. 1, the power source equipment 100 includes an inspection device 10 to inspect multiple connecting ports 11, 12, 13 and 14 to determine whether the target devices 21, 22 and 23 connected thereto are suitable powered devices. If the determination is positive, it will further determine a power level to be supplied to the powered devices 21, 22 and 23. The inspection device 10 may be a known inspection device for powered devices in the PoE system. It includes an inspection signal generator 16, a response signal receiver 17, and a computing unit 15. In this setting, the inspection signal generator 16 supplies a voltage signal to the specific connecting ports. After a predetermined period, the response signal receiver 17 will receive the response signal from the connecting port. Then, the computing unit 15 will transform the response signal into current signal to determine whether the connecting port has connected to a target device, and if it has, it will determine what the power needed by the powered device is. Alternatively, the inspection signal generator 16 may generate a current signal to be applied to the specific connecting port. After a predetermined time, the response signal receiver 17 may receive the response signal from the connecting port. Then, the computing unit 15 may transform the response signal into a voltage signal. Based on the characteristics of the voltage signal, the computing unit 15 may conduct the above determination. Usually, the predetermined period is less than 500 ms, but the actual time may be adjusted based on the actual application.

The above mentioned structure and functionality of the inspection device 10 are commonly known to a person of ordinary skill in the art, and hence will not be further explained. In the below description, we will use "inspection" to mean the step of determining whether the connecting port has connected to a target device and whether the target device is a suitable powered device. We will use "classification" to mean the step of determining the required power for the powered device.

In the present invention, the power source equipment 100 of the PoE system may be used to inspect multiple connecting ports 11, 12, 13 and 14 to determine whether the connecting ports 11, 12, 13, and 14 have connected to target devices, and whether the connected target devices are qualified powered devices. If it is, it will determine what the required power shall be. In a preferred embodiment of the present invention, once the computing unit 15 has determined that a connecting port has connected to a powered device, the inspection signal generator 16 may send a classification inspection signal to the connecting port. After it sends a first inspection signal/classification inspection signal, it then sends a second inspection signal/classification inspection signal to another connecting port that needs the second inspection signal. Such mechanism allows only one single inspection device serve to inspect and classify multiple powered devices. It may also be applied by multiple inspection devices, wherein each of the inspection device is used to inspect a single powered device.

In FIG. 1, in addition to the computing unit 15, the inspection signal generator 16, and the response signal receiver 17, the inspection device 10 further includes a monitoring device 18. The monitoring device 18 may be used to dynamically adjust the upper limit of power supply to each of the powered devices from the inspection device 10.

Specifically, the inspection device 10 may determine the power supply classification for a powered device connected to the connecting port based on the classification response signal received in the connecting port. According to the IEEE 802.3af/at standard, the classification may be class 0, 1, 2, 3 or 4. The power allocation Iclass associated with the classification is, respectively, 15.5 W, 4 W, 7 W, 15.5 W or 30 W. In a preferred embodiment of the present invention, the power source equipment 100 supplies power with an upper limit power value Iallow to the connecting ports/powered devices and the value of the upper limit power Iallow is between the power allocation value Iclass associated with the class of the connecting port/powered device and a predetermined lower bound Ilower. Generally, power allocation, the predetermined lower bound may be a fixed percentage of Iclass. For example, it may be 25% of the Iclass, but other reference values may also be applied to the present invention. Sometimes, the predetermined lower bound Ilower can also be ignored. For example, it may be set as the upper limit power allocation Iclass for the classification level that is next to the current classification level. The upper limit power Iallow may be set to the upper limit power allocation Iclass for the classification. However, since the present system includes a dynamic adjustment circuit and structure, the upper limit power value Iallow may be any value between the upper limit power allocation Iclass and a predetermined lower bound Ilower. It shall be noted that if the upper limit power Iallow is set too low, the system may mistakenly supply power to a number of powered devices that exceeds its power supplying capability. The actual value of the upper limit power may be determined based on experience and configured into the system settings.

According to some embodiments of the present invention, the monitoring device 18 may adjust the power allocation to the power-supplying connecting ports, when a new powered device requests to join the system but there is no sufficient power to be allocated to the connecting port in connection with the new powered device. When this happens, the monitoring device 18 monitors the power consumption of the connecting ports by inspecting the powered device connected to a connecting port to determine its power consumption at each time. Based on this inspection, it may calculate a power consumption trend parameter. The monitoring device 18 may conduct the inspection at fixed intervals within a predetermined time period, thereby generating multiple power consumption values for the connecting ports. Although various inspection time, frequency, and cycle may be applied to the present invention, it is preferable that the inspection will generate enough information regarding the power consumption variation of the powered devices. In a real application, for example, it may conduct the inspection 10 times in 1 second with fixed intervals or variable intervals. The results of these inspections may be plotted against the time. Upon normalization, the trend parameter may be calculated based on the slopes. The constant inspection and trend parameter calculation may be accomplished by common electric circuits or software and thus will not be further explained.

In the present invention, the monitoring device 18 will adjust the upper limit power values Iallow for the specific connecting ports according to the following:

1) Stopping the power source equipment from supplying power to a connecting port when the trend parameter indicates the connecting port often over-consumes the power allocation Iclass;

2) Increasing the upper limit power value Iallow of the connecting port to a value no greater than the power allocation Iclass, when the trend parameter indicates a rising power consumption trend for the connecting port, for example, when among 10 inspection points, 3 or more inspection points have power consumption greater than the power consumption associated with the preceding inspection points; and 3) Decreasing the upper limit power value Iallow of the connecting port to a value no less than the predetermined lower bound Ilower, when the trend parameter indicates a declining power consumption trend for the connecting port, for example, when among 10 inspection points, 3 or more inspection points have power consumption less than the power consumption associated with the preceding inspection points.

In situation 1, the powered device often consumes power beyond the upper limit power allocation Iclass for the classification. This indicates that the powered device has a wrong classification and this may interfere with operations of other powered devices. According to the IEEE PoE requirement, the system must stop supplying power to it. At this time, the power source equipment 10 may begin to adjust the classification of the powered device to a class with higher power allocation value. This, however, is beyond the scope of the present invention.

In situation 2, the powered device has a rising power consumption trend. This indicates the current upper limit power Iallow may not be sufficient. Hence, it is adjusted upward to prevent the powered device from being shut down. However, if the upper limit power Iallow has already reached the upper limit power allocation Iclass for the classification, it will not be adjusted. If the power consumption of the powered device continues to exceed the upper limit power allocation Iclass for the classification, the system will enter situation 1 to stop supplying power to the powered device.

In situation 3, the powered device has a declining power consumption trend. This indicates the current upper limit power Iallow may be too high to cause waste. Hence, it is adjusted downward to provide more power for additional powered devices. However, if the upper limit power Iallow has already reached the predetermined lower bound Ilower set by the inspection device 10, it will not be adjusted so as to prevent the powered device from overload outage.

In its real application, the power source equipment 10 of the PoE system may divide the power allocation of a class into multiple pitches, and adjust the upper limit power Iallow based on the pitch. The classes may be divided by equal pitches or variable pitches. For example, the power allocation for class 1 may be further divided into class 1-1, class 1-2, and class 1-3 for further adjustment. Other adjust method may also be incorporated into the embodiments of the present invention.

In addition, in scenario 3, if the trend value indicates that the powered device has a power consumption that is often below the power allocation of its immediate-below classification, the power source equipment 100 may begin to change the classification of the powered device downward. As previously mentioned, this is beyond the scope of the present invention, and the class-adjustment operation depends on the particular PoE systems. There exists known class-adjustment techniques, and the details of them will not be further provided.

Figure 2:
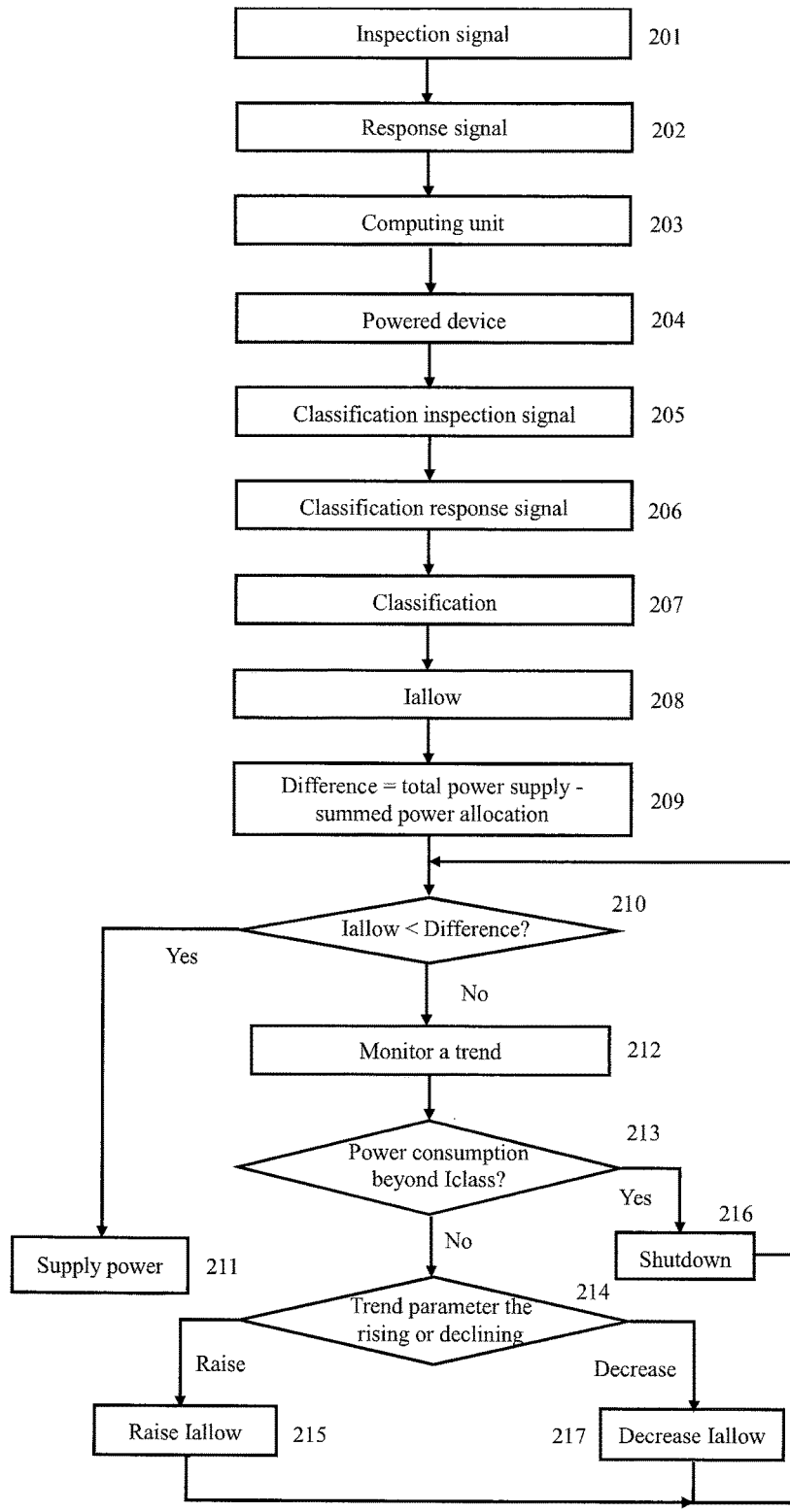
FIG. 2 illustrates a flow diagram of supplying power for the PoE system.
Figure 3:
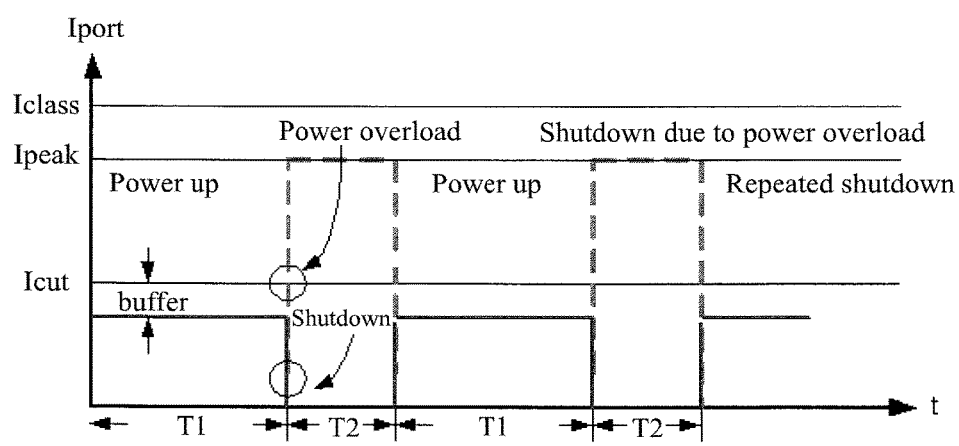
FIG. 3 shows a graph of the power consumption of a common powered device, i.e., a web cam.

The following explanation relates to the power supply method for the PoE system of this invention. FIG. 2 illustrates a flow chart of supplying power for the PoE system. The method illustrated may be used by the power source equipment of the PoE system as shown in FIG. 1.

As illustrated in FIG. 2, the method begins at step 201, wherein an external device connected to a connecting port is detected, therefore the inspection signal generator 16 sends an inspection signal to the connecting port. As previously described, the inspection signal is usually a voltage signal, which may include multiple sub-signals. A person of ordinary skill in the art would also recognize that the inspection signal may also be a current signal, or signals of other types. After a predetermined period following the sending of the inspection signal, at step 202, the response signal receiver 17 begins to receive response signal from the connecting port. As previously described, the predetermined period may be 350 ms. At step 203, the response signal is sent to the computing unit 15 to determine whether the connecting port has connected to a target device and whether the target device is suitable for supplying power. If the inspection signal is a voltage signal, the computing unit 15 will usually transform the response signal into a current signal and conduct the subsequent determination based on known techniques. It is also possible for it to transform the response signal to other type of signal for the determination.

At step 204, the computing unit 15 determines based on the response signal whether the connecting port has connected to a suitable powered device for supplying power. The inspection signal generator 16 is instructed to send to a classification inspection signal. Of course, if the computing unit 15 decides that the connecting port has not connected to a target device or a suitable powered device, the classification signal will not be sent.

At step 205, the inspection signal generator 16 sends a classification inspection signal to the connecting port. The response signal receiver 17 at step 206 will detect the response signal from the connecting port. The classification response signal will at step 207 provide the computing unit 15 information for determine the power classification for the connecting port to provide. Methods of such classification are commonly known in the art. At step 208, the computing unit 15 sets an upper limit power Iallow to supply to the powered device, wherein its value is between the upper limit power allocation Iclass for the classification so determined and a predetermined lower bound Ilower. At step 209, the computing unit 15 computes the difference between the total power supply for the power source equipment and summed upper limit power value Iallow for all currently-supplying powered devices. At step 210, the computing unit 15 determines whether the difference is greater than the upper limit power Iallow determined for the powered device. If it is, then at step 211 it will supply power to the connecting port in connection with the powered device. Otherwise, it will conduct adjustments for the upper limit power values of the currently power-supplying connecting ports, trying to release extra power for this connecting pot.

The monitoring device 18 will at step 212 continue to monitor all power-supplying connecting ports to compute a trend parameter based on the time-variation of the power consumption. At step 213, it will determine whether the trend parameter of a connecting port indicates that the connecting port often consumes power beyond the upper limit power allocation Iclass for its classification. If it is, at step 216, it will stop supplying power to the connecting port and conduct adjustment for a subsequent connecting port. If it is not, at step 214, the monitoring device will determine whether the trend parameter indicates the rising or declining power consumption. If it is rising, at step 215, it will raise the upper limit power Iallow for the subsequent connecting port, to a value not beyond the upper limit power allocation Iclass for the classification. If it is declining, at step 217, it will decrease the upper limit power Iallow for the connecting port, to a value no less than the predetermined lower bound Ilower. Thereafter, the adjustment repeats, until all power-supplying connecting ports have been adjusted with their upper limit power values Iallow. After the adjustment, the summed upper limit power value is changed, and the step returns to 201, where the new summed upper limit power value is sued in the determination.

In the above embodiments, the power source equipment may dynamically adjust the upper limit power values supplied to the powered devices within their classifications. It can not only provide the correct needed power to save power, it can also release unneeded power allocation to supply to additional powered devices or powered devices with lower priority. This allows the system resource to be used effectively and efficiently.

Although the invention has been described with reference to specific embodiments regarding the inspection device and method for the powered device in a PoE system, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A power source equipment for a power over Ethernet (PoE) system, comprising:
    at least two connecting ports, each to be connected by a powered device via a network wire;
    an inspection device in connection with the respective connecting ports and configured to inspect whether a connecting port is connected by a powered device suitable for supplying power and to determine a classification of the powered device; and
    a monitoring device, configured to continuously monitor particular connecting ports to obtain a power consumption value along a time axis of a powered device connected to the respective ports;
    wherein the power source equipment is configured to:
        set an upper limit value Iallow between a power allocation Iclass associated with the classification and a predetermined lower bound Ilower; and
        supply power to a connecting port with a corresponding upper limit power, when its upper limit value Iallow is lower than a difference of a total power supply of the power source equipment and a summed upper limit power of the power-supplying connecting ports;
    wherein the monitoring device is further configured to:
        calculate a power consumption trend parameter for the respective connecting ports, based on the monitored time-axis power consumption values of the connecting ports;
        stop the power source equipment from supplying power to a connecting port when the trend parameter indicates the connecting port over-consumes the power allocation Iclass for longer than a predetermined time;
        increase the upper limit power value Iallow of the connecting port to a value no greater than the power allocation Iclass, when the trend parameter indicates a rising power consumption trend for the connecting port; and
        decrease the upper limit power value Iallow of the connecting port to a value no less than the predetermined lower bound Ilower, when the trend parameter indicates a declining power consumption trend for the connecting port,
    wherein the monitoring device determines a rising power consumption trend when there is a predetermined number of inspection point values greater than their preceding inspection points, and determines a declining power consumption trend when the predetermined number of inspection point values is less than their preceding inspection points.

2. The power source equipment of claim 1, wherein the predetermined number is at least 3.

3. The power source equipment of claim 1, wherein the power source equipment divides each classification into a plurality of pitches and adjusts the upper limit power value Iallow based on the pitches.

4. The power source equipment of claim 3, wherein the class is divided by equal pitches or variable pitches.

5. The power source equipment of claim 1, wherein the power source equipment is further configured to degrade the classification of the connecting port, when the trend parameter indicates the connecting port consumes less power than the power allocation Iclass of a lower class for longer than the predetermined time.

6. A method of supplying power from a power source equipment of a power over Ethernet (PoE) system, wherein the power source equipment comprises:
- at least two connecting ports, each to be connected by a powered device via a network wire;
- an inspection device in connection with the respective connecting ports and configured to inspect whether a powered device suited for supplying power is connected with a particular connecting port and to determine a power classification to be supplied to the connecting port, and
- a monitoring device to monitor power consumption of the connecting ports and to adjust power supplied to the connecting ports;
- the method being actuated, after said inspection and classification are completed and comprising the steps of:
  - after a device connected to a connecting port is determined as a suited powered device, setting an upper limit value Iallow between a power allocation Iclass associated with the classification and a predetermined lower bound Ilower for the connecting port;
  - supplying power to the connecting port with the upper limit power, when its upper limit value Iallow is lower than a difference of a total power supply of the power source equipment and a summed upper limit power of the power-supplying connecting ports; otherwise,
  - continuously monitoring all power-supplying connecting ports to obtain power consumption values along a time axis of the respective connecting ports, and to determine a power consumption trend parameter for the connecting ports based on the monitored power consumption values;
  - increasing the upper limit power value Iallow of a connecting port to a value no greater than the power allocation Iclass, when the trend parameter indicates a rising power consumption trend for the connecting port;
  - decreasing the upper limit power value Iallow of a connecting port to a value no less than the predetermined lower bound Ilower, when the trend parameter indicates a declining power consumption trend for the connecting port; and
  - stopping the power source equipment from supplying power to a connecting port, when the trend parameter indicates the connecting port over-consumes the power allocation Iclass for longer than a predetermined time,
- wherein the monitoring device determines a rising power consumption trend when there is a predetermined number of inspection point values greater than their preceding inspection points, and determines a declining power consumption trend when the predetermined number of inspection point values is less than their preceding inspection points.

7. The method of claim 6, further comprising the steps of dividing each classification into a plurality of pitches and adjusting the upper limit power value Iallow based on the pitches.

8. The method of claim 7, wherein the class is divided by equal pitches or variable pitches.

9. The method of claim 6, further comprising the step of degrading the classification of the connecting port, when the trend parameter indicates the connecting port consumes less power than the power allocation Iclass of a lower class for longer than a predetermined time.

10. The method of claim 6, wherein the predetermined number is at least 3.

* * * * *